US010584941B2

(12) United States Patent
Masarik et al.

(10) Patent No.: US 10,584,941 B2
(45) Date of Patent: Mar. 10, 2020

(54) NON-CONTACT OPTICAL CONNECTIONS FOR FIREARM ACCESSORIES

(71) Applicant: N2 Imaging Systems, LLC, Irvine, CA (US)

(72) Inventors: David Michael Masarik, Irvine, CA (US); Peter Denis Vallianos, Irvine, CA (US); Susan Myers Rico, Irvine, CA (US); Gregory Petersen, Newport Beach, CA (US)

(73) Assignee: N2 Imaging Systems, LLC, Irvine, CA (US)

( * ) Notice: Subject to any disclaimer, the term of this patent is extended or adjusted under 35 U.S.C. 154(b) by 0 days.

(21) Appl. No.: 16/150,503

(22) Filed: Oct. 3, 2018

(65) Prior Publication Data

US 2019/0033039 A1 Jan. 31, 2019

Related U.S. Application Data

(62) Division of application No. 15/341,644, filed on Nov. 2, 2016, now Pat. No. 10,113,837.

(60) Provisional application No. 62/250,131, filed on Nov. 3, 2015.

(51) Int. Cl.
*F41G 11/00* (2006.01)
*G02B 6/42* (2006.01)
*H04B 10/114* (2013.01)

(52) U.S. Cl.
CPC .......... *F41G 11/003* (2013.01); *G02B 6/4206* (2013.01); *G02B 6/4246* (2013.01); *H04B 10/1143* (2013.01)

(58) Field of Classification Search
CPC ... F41G 11/003; G02B 6/4206; G02B 6/4246; H04B 10/1143

USPC ......... 42/84, 71.01, 72, 111, 117, 123, 75.01
See application file for complete search history.

(56) References Cited

U.S. PATENT DOCUMENTS

| 5,584,137 | A | * | 12/1996 | Teetzel | F41A 9/62 362/114 |
| 7,627,975 | B1 | | 12/2009 | Hines | |
| 8,093,992 | B2 | * | 1/2012 | Jancic | F41G 1/35 340/12.5 |
| 8,488,969 | B1 | * | 7/2013 | Masarik | H04B 10/22 398/113 |
| 2003/0163943 | A1 | * | 9/2003 | Holmberg | F41C 27/00 42/142 |

(Continued)

FOREIGN PATENT DOCUMENTS

EP 2722632 A2 4/2014

OTHER PUBLICATIONS

Extended European Search Report dated Jul. 17, 2017, issued during the prosecution of corresponding European Patent Application No. EP 16197158 (9 pages).

(Continued)

*Primary Examiner* — John Cooper
(74) *Attorney, Agent, or Firm* — Knobbe, Martens, Olson & Bear, LLP

(57) ABSTRACT

A tactical rail arrangement for a firearm includes a tactical rail configured to secure one or more firearm accessories to a firearm, wherein the tactical rail includes a plurality of non-contact optical connections configured to transfer optical signals between one or more accessories mounted to the tactical rail and/or to one or more electrical systems of the firearm.

20 Claims, 8 Drawing Sheets

(56) References Cited

U.S. PATENT DOCUMENTS

| | | | |
|---|---|---|---|
| 2007/0214700 A1* | 9/2007 | Chang | F41G 1/32 42/119 |
| 2008/0010890 A1* | 1/2008 | Vice | F41C 23/16 42/72 |
| 2008/0028663 A1* | 2/2008 | Day | F41G 1/38 42/122 |
| 2009/0111454 A1* | 4/2009 | Jancic | F41G 1/35 455/420 |
| 2010/0031552 A1* | 2/2010 | Houde-Walter | F41A 35/00 42/72 |
| 2012/0159833 A1* | 6/2012 | Hakanson | F41G 1/30 42/131 |
| 2012/0192476 A1* | 8/2012 | Compton | F41G 11/003 42/84 |
| 2012/0311910 A1* | 12/2012 | Mironichev | F41C 23/10 42/90 |
| 2012/0327247 A1* | 12/2012 | Mironichev | F41G 1/32 348/164 |
| 2013/0036646 A1* | 2/2013 | Rubac | F41C 23/16 42/90 |
| 2014/0007485 A1* | 1/2014 | Castejon, Sr. | F41G 1/35 42/117 |
| 2014/0130392 A1* | 5/2014 | Oh | F41G 11/003 42/84 |
| 2015/0020427 A1* | 1/2015 | Compton | F41C 27/00 42/71.01 |
| 2016/0033234 A1* | 2/2016 | Swift | F41G 11/003 42/75.01 |

OTHER PUBLICATIONS

Extended European Search Report dated Jul. 5, 2017, issued during the prosecution of corresponding European Patent Application No. EP 16197158 (9 pages).

* cited by examiner

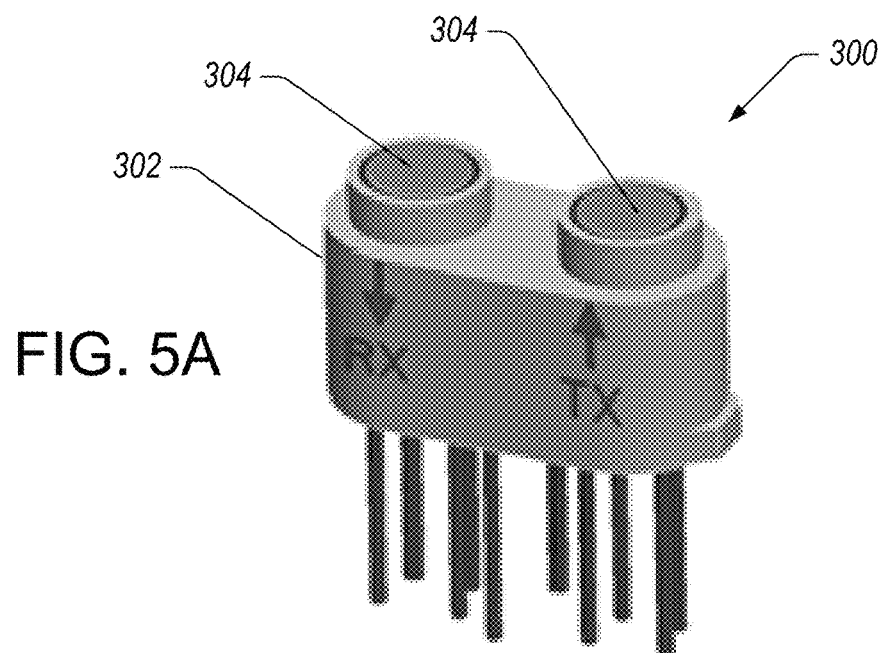
FIG. 5A
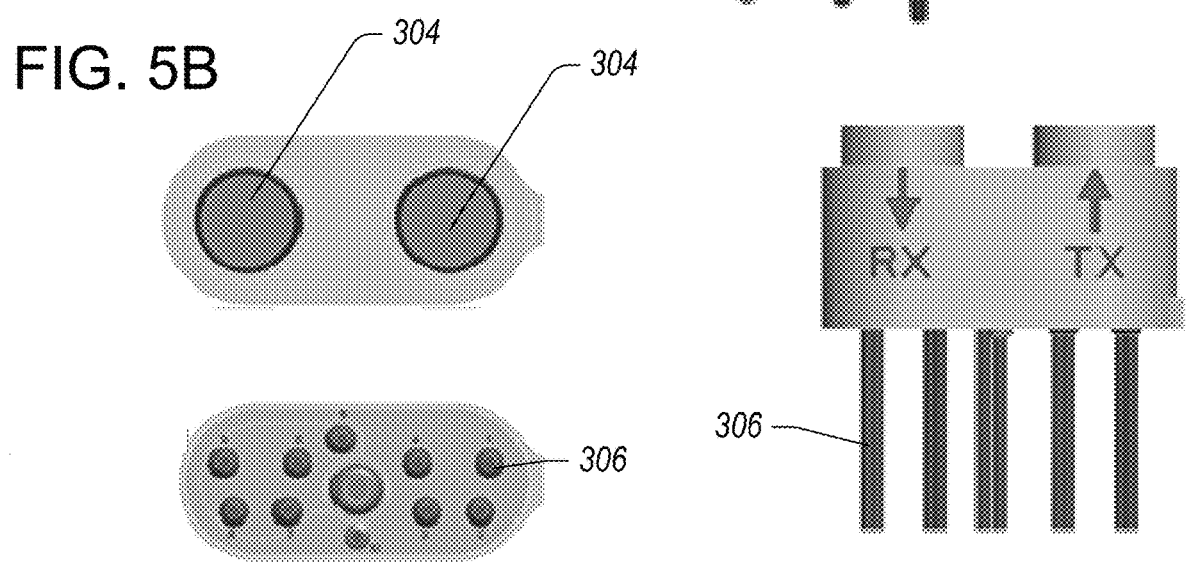
FIG. 5B
FIG. 5C
FIG. 5D

NON-CONTACT OPTICAL CONNECTIONS FOR FIREARM ACCESSORIES

CROSS REFERENCE TO RELATED APPLICATIONS

This application claims the benefit of priority of U.S. Provisional Patent Application No. 62/250,131, filed Nov. 3, 2015. The contents of which are hereby incorporated by reference herein in their entirety.

BACKGROUND

Field

This disclosure relates to a firearm rail and firearm accessories configured to transfer data using non-contact optical connections and optical signals.

Description of Related Art

Firearms can include a tactical rail (e.g., a Picatinny or Weaver rail) configured to receive and secure various accessories. For example, accessories coupled to the tactical rail may include a laser, night vision scope, range finder, camera or other type of accessory that utilizes power. The accessories may also send or receive data.

SUMMARY

Example embodiments described herein have several features, no single one of which is indispensable or solely responsible for their desirable attributes. Without limiting the scope of the claims, some of the advantageous features will now be summarized.

A firearm can include a tactical rail for receiving and securing one or more firearm accessories. The tactical rail can include one or more non-contact optical connections configured to interface with a corresponding non-contact optical connection on a firearm accessory. When the accessory is mounted on the tactical rail, the non-contact optical connections on the rail and accessory align sufficiently such that optical signals can be transferred between the rail and the accessory to enable communication of optical signals between accessories mounted on the rail and/or between an accessory mounted to the rail and the firearm itself (e.g., a control or communication system integrated into the firearm or otherwise associated with the firearm).

A firearm accessory can include a transmit non-contact optical connection associated with a transmitter optical sub-assembly (TOSA) and a receive non-contact optical connection associated with a receiver optical sub-assembly (ROSA). The TOSA is configured to convert electrical signals to optical signals and transmit the optical signals through the transmit non-contact optical connection. The ROSA is configured to receive optical signals through the receive non-contact optical connection and convert the received optical signals to electrical signals. Thus, the firearm accessory can be configured to transmit and receive optical data to a tactical rail with non-contact optical connections and/or other firearm accessories with non-contact optical connections.

A tactical rail for a firearm can include a plurality of non-contact optical connections configured to transfer optical signals between one or more accessories mounted to the tactical rail and/or to one or more electrical systems of the firearm. In some embodiments, the tactical rail can include a transmit optical sub-assembly (TOSA) and a receive optical sub-assembly (ROSA) respectively coupled to one or more transmit non-contact optical connections of the plurality of non-contact optical connections and to one or more receive non-contact optical connections of the plurality of non-contact optical connections. Thus, the tactical rail can be configured to provide a communication network for accessories mounted to the tactical rail, wherein communication between accessories utilizes optical signals. The tactical rail can also be configured to control communication across the communication network utilizing a communication system, the communication system being integral to the firearm or otherwise associated with the firearm.

BRIEF DESCRIPTION OF THE DRAWINGS

Aspects and advantages of the embodiments provided herein are described with reference to the following detailed description in conjunction with the accompanying drawings. Throughout the drawings, reference numbers may be reused to indicate correspondence between referenced elements. The drawings are provided to illustrate example embodiments described herein and are not intended to limit the scope of the disclosure.

FIGS. 5A-5D illustrate an example of a unitary mechanical housing that includes a TOSA and a ROSA, the housing including corresponding non-contact optical connections for the TOSA and the ROSA as well as electrical pins, shown in perspective, top plan, bottom plan, and side elevation views, respectively.

DETAILED DESCRIPTION

While the present description sets forth specific details of various embodiments, it will be appreciated that the description is illustrative only and should not be construed in any way as limiting. Additionally, although particular embodiments may be disclosed or shown in the context of tactical rails for rifles, elements of the disclosure may be extended for use in handguns and other firearms as well. Further, although embodiments disclosed herein can be used with powered tactical rails, embodiments are also contemplated in which the tactical rails do not include electrical power connections for firearm accessories. Although some embodiments are illustrated with pairs of non-contact optical connections respectively for transmission and receipt of optical signals, it will be understood by those having ordinary skill in the art that, in some embodiments, a single non-contact optical connection can be used (e.g., for one-way communication or a single non-contact optical connection can be configured to transmit and receive optical signals). Additionally, it will be understood that different rail systems can be used, beyond those illustrated herein. In particular, a rail system for a firearm can include the disclosed non-contact optical connections without being a Picatinny or Weaver rail. While military-style firearms are generally described and illustrated herein, the teachings of this application are equally applicable to other firearms, such as handguns, fixed-mount machine guns, as well as non-weapon based systems. Any feature, structure, function, material, method, or step disclosed and/or illustrated in this specification can be used by itself or with or instead of any other feature, structure, function, material, method, or step disclosed and/or illustrated elsewhere in this specification. Each portion of this specification is contemplated to be interchangeable and no portion is indispensable or essential.

Figure 1A:
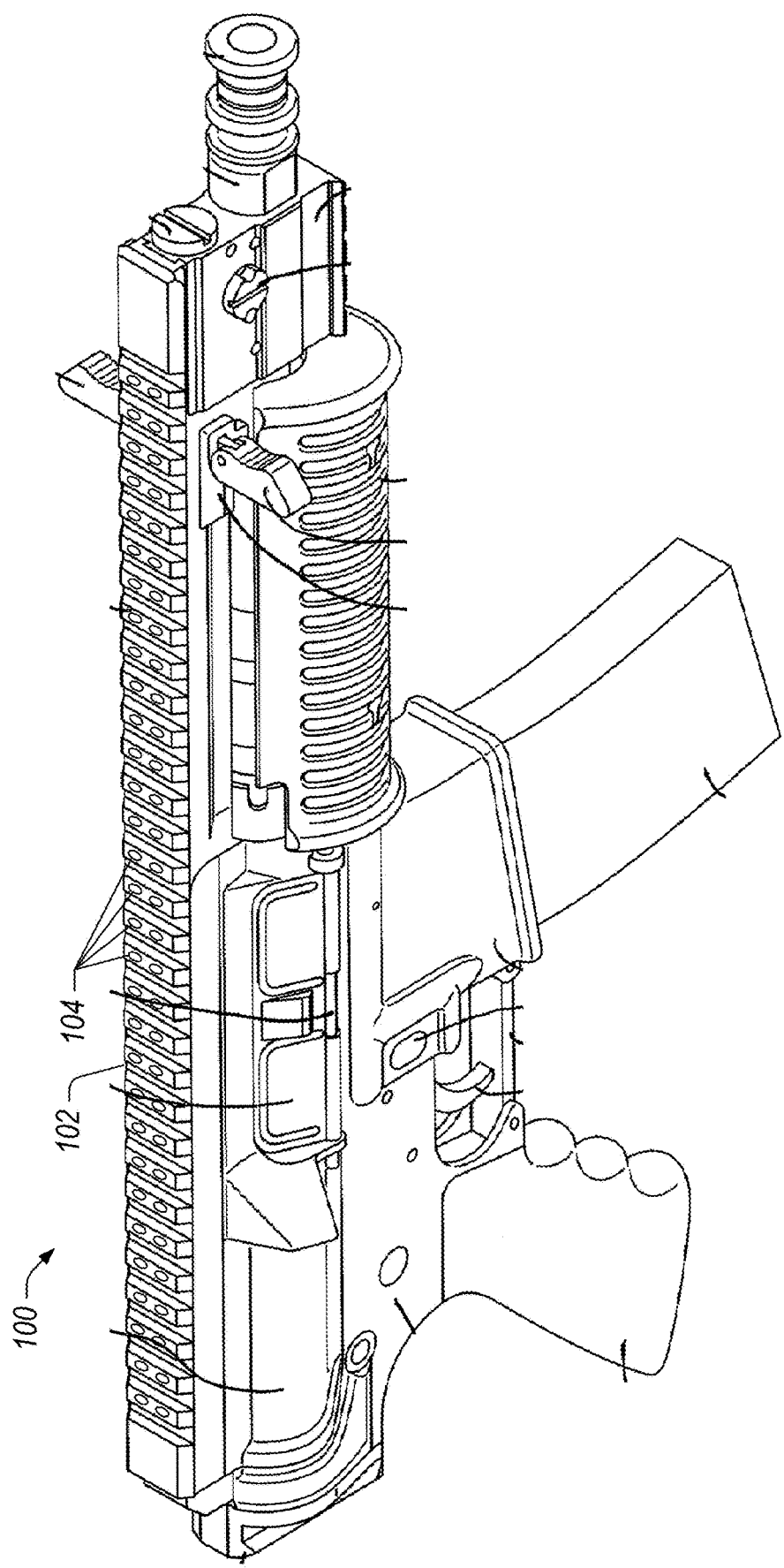
FIG. 1A illustrates an example tactical rail of a firearm, the tactical rail having a plurality of non-contact optical connections.
Figure 1B:
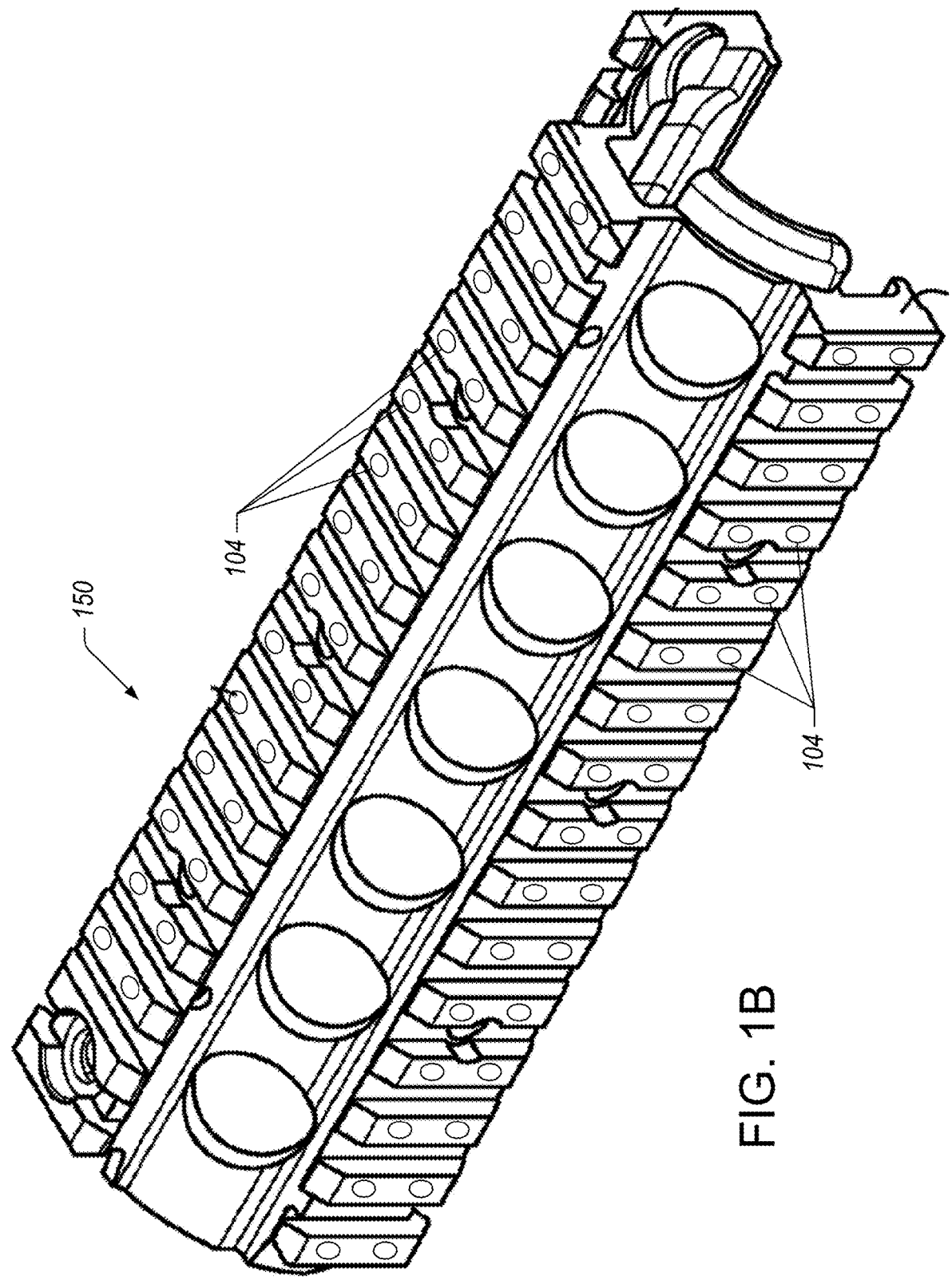
FIG. 1B illustrates an example modular rail, configured to be attached to a firearm or other apparatus.

FIG. 1A illustrates a tactical rail 102 of a firearm 100, the tactical rail 102 having a plurality of non-contact optical connections 104. FIG. 1B illustrates a modular rail 150, configured to be attached to a firearm or other apparatus. The tactical rail 102 comprises a series of ridges with a T-shaped cross-section interspersed with flat "spacing slots." Accessories are mounted either by sliding them on from one end or the other; by means of a Weaver mount, for example, which is clamped to the rail with bolts, thumbscrews or levers; or onto the slots between the raised sections. Other connections means are possible.

The tactical rail was originally used for scopes. However, once established, the use of the rail was expanded to other accessories, such as tactical lights, laser aiming modules, night vision devices, reflex sights, foregrips, bipods, and bayonets. Because rails were originally designed and used for telescopic sights, the rails were first used only on the receivers of larger caliber rifles. But their use has extended to the point that tactical or Picatinny rails and accessories have replaced iron sights in the design of many firearms, and they are also incorporated into the undersides of semi-automatic pistol frames and even on grips.

The firearm 100 contains standard components, such as receiver, grip, barrel, handguard, and butt stock. The tactical rail 102 can be a Picatinny Rail or MIL-STD-1913 rail (and NATO equivalent—STANAG 4694). The tactical rail 102 can include a bracket used on some firearms to provide a standardized accessory mounting platform. The tactical rail 102 comprises a series of ridges with a T-shaped cross-section interspersed with flat "locking slots" (also termed "recoil groove"). Scopes and other accessories can be mounted either by sliding them on from one end of the tactical rail 102 or the other end of the tactical rail 102 by means of a "rail-grabber" which is clamped to the tactical rail 102 with bolts, thumbscrews, or levers, or onto the slots between the raised sections.

The accessories attached to the tactical rail 102 can be powered via battery packs connected or integral thereto. For example, a lithium battery may be contained within a battery-housing integral with, or internal to, the accessory. In some embodiments, the tactical rail includes one or more electrical contacts configured to provide power to accessories attached to the tactical rail 102. The tactical rail 102 comprises a series of ridges 105 with a T-shaped cross-section interspersed with flat spacing slots 110, and can be configured to provide attachment points to a top and/or sides of the firearm 100.

One example of an accessory for a weapon is a scope which includes a reticle which can be illuminated for use in low light or daytime conditions. Other examples of powered accessories include, but are not limited to: tactical lights, laser aiming modules, and night vision devices.

In some embodiments, the tactical rail 102 can be used to electrically interconnect a power source (e.g., a battery pack) with the various accessories mounted on the rail, such that the tactical rail 102 provides the mechanical support for the accessory and also provides electrical interconnection.

The tactical rail 102 includes a plurality of non-contact optical connections 104 configured to transmit and receive optical digital signals. The non-contact optical connections 104 can be networked together so that one or more accessories can communicate with one another. Generally, the plurality of non-contact optical connections 104 are connected to a communication hub configured to receive optical signals from the attached accessories. The communication hub can also be connected to a processing system configured to process, analyze, transform, or otherwise utilize the data transferred from the connected accessories. This processed information can be passed back to the accessory or to a different accessory. For example, a laser range finder can communicate a distance to a target that can be received by the processing system and this distance can be transformed and transmitted to a weapon sight mounted on the tactical rail 102 so that the sight displays the distance determined by the laser range finder. In some embodiments, the communication hub is configured to communicate wirelessly with a local device or headgear system (e.g., a goggle, battery pack, etc.). The non-contact optical connections 104 can be optically coupled to fiber optics configured to route optical signals between the non-contact optical connections 104 and/or to the communication hub.

In some embodiments, the tactical rail 102 can be a quad rail with four accessory mounts. In some embodiments, the accessory mounts are fabricated of thermal plastic. The accessory mounts may receive a variety of accessories such as, for example and without limitation, tactical lights, laser aiming modules, night vision devices, optics, reflex sights, foregrips, bipods, bayonets and others. Non-powered accessories may be mounted to the tactical rail 102 as well.

In powered rail embodiments, each of the accessory mounts can be configured with integral conductive elements comprising a positive contact and ground/negative contact. In some embodiments, the positive contact is incorporated within the fixed side of the accessory mount and the ground is on the adjustable tab side of the accessory mount. In certain embodiments, the conductive element is a flat piece of non-corrosive metal secured in, and running along all or a portion of the length of a groove of the tactical rail. The negative contact can be positioned on the accessory mount to contact a conductive element along an oppositely positioned groove in the tactical rail 102. The DC circuit is thus completed when the accessory amount is snapped onto the rail 102 thereby allowing power from an external battery, internal battery or both to power an accessory attached to the accessory mount.

In some embodiments, the battery may be integrated into a firearm (e.g., butt stock or grip) or attached thereto with a DC contact between the tactical rail 102 and the firearm. Leads or wires within the accessory mounts carry electrical current to power the accessories which incorporate lead contacts on an outer surface thereof to contact the leads when installed into the mount so as to receive the electrical current from the leads for powering the accessories. In various embodiments, the accessories may snap into the mounts locking the leads and lead contacts thereby forming a secure electrical contact. Similarly, non-contact optical connections on the accessory can be substantially aligned with the non-contact optical connections 104 to provide optical communication between the tactical rail 102 and the accessory. The battery or batteries may be located in the fore grip and stock or elsewhere in the forearm or weapon. Besides batteries, small fuel cells (running on Butane, or water and hydrogen for example) and solar cells can be used to provide power to the rail.

In one embodiment, a bayonet connection or mount is used to attach the accessory to the accessory mount. This type of connection provides a reliable connection between the accessory and the accessory mount for maintaining the accessory in a secure position and aligning the non-contact optical connections of the accessory to the corresponding non-contact optical connections 104.

Control of the accessories may be provided via a wireless system separate from the tactical rail 102. In some embodiments, wireless Bluetooth Low Energy (BLE) can be used. In some embodiments, individual rail-mounted accessories incorporate a BLE microprocessor/transceiver capable of sending and receiving wireless signals in a paired, point-to-point arrangement. The BLE signals 215-1 through 215-N may be encrypted as well.

The non-contact optical connections 104 can be arranged to provide transmission of optical signals and reception of optical signals. In some embodiments, individual ridges (or troughs or valleys) include two non-contact optical connections, a first non-contact optical connection is dedicated to transmission of optical signals while a second non-contact optical connection is dedicated to receiving optical signals. The first can be optically coupled to a transmission optical sub-assembly (TOSA) and the second can be optically coupled to a receiving optical sub-assembly (ROSA). In some embodiments, a single non-contact optical connection is provided on a ridge (or valley) of the tactical rail 102, and the single non-contact optical connection can be configured to be optically coupled to a TOSA, a ROSA, or a combined transmission and receiving optical sub-assembly.

Figure 1C:
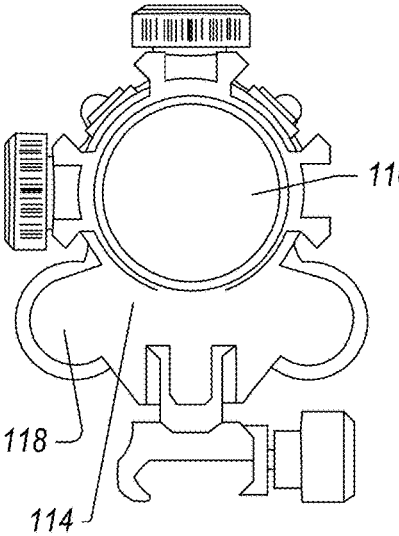
FIG. 1C-1E illustrate example embodiments of a sight system accessory in side elevation, end elevation, and perspective views, respectively.
Figure 1D:
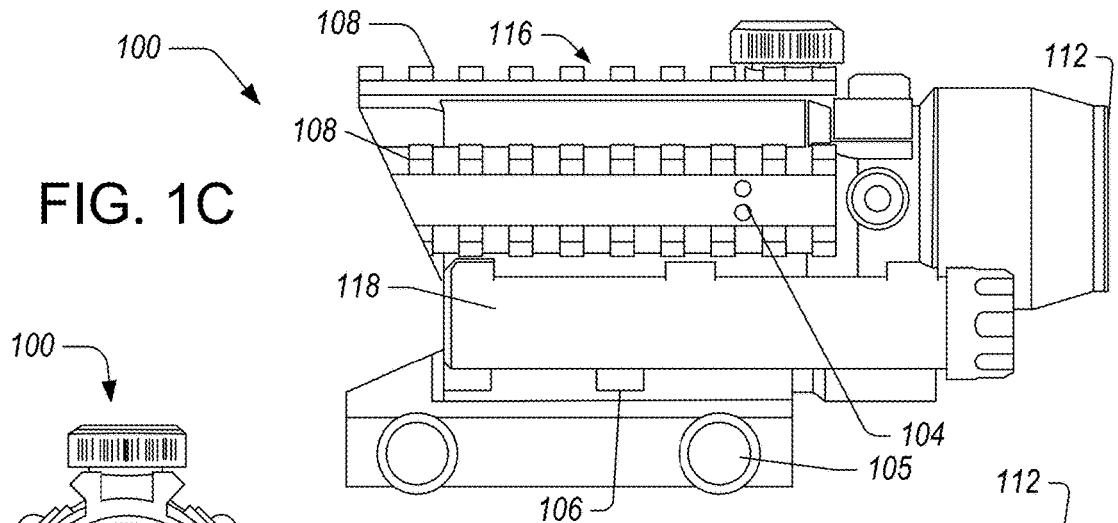
Figure 1E:
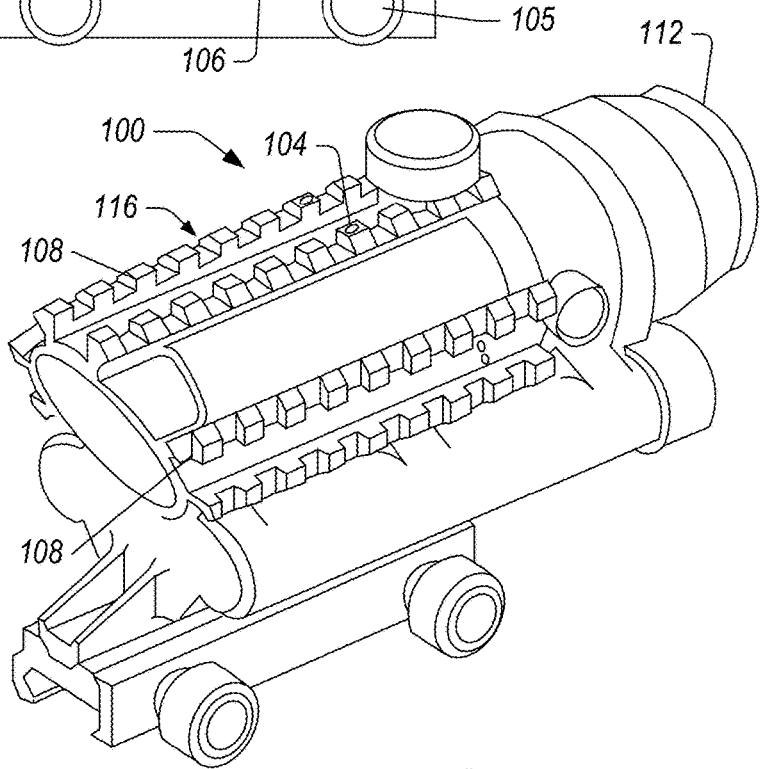

FIGS. 1C-1E illustrate example embodiments of a sight system 100 that includes a tactical rail 108 with non-contact optical connections 104. The sight system 100 can include a housing 102 configured to house internal optical components, an image sensor, a display, a power source, controls, and the like. The housing 102 can be configured to be structurally rigid and durable and lightweight, using, for example, metals such as aluminum, plastics, a combination of these or other similar materials. The housing 102 can include controls 105 for a user to adjust how the sight system 100 functions. For example, the controls 105 can include a diopter adjustment, a reticle adjustment, a mode-switching control, focus controls, zoom controls, power controls, and the like. The housing 102 can include mounting rails 106 that allows the sight system 100 to be mounted to a rail of a gun or other device. The mounting rails 106 can be configured to mate with different rail types including, for example, Picatinny rails, Weaver rails, and the like.

The 102 housing can include module rails 108 integrated into the housing for mounting, powering, and connecting to modular add-on components which can be bore-sighted such as, for example, a laser range finder ("LRF"), a thermal imager with close combat or longer range optic, an ultra-violet ("UV") or short-wave infrared ("SWIR") imager, a UV or SWIR pointer or illuminator, or the like. The module rails 108 can be configured to be compatible with modules having Picatinny rails, Weaver rails, or the like. The module rails 108 can be configured to provide power to modules connected thereto through inductive means or through electrical contacts. The module rails 108 can be configured to transmit data between modules attached thereto or to send or receive data from attached modules. As described herein, the mount rails 106 or module rails 108 can include data and/or power contacts that provide electrical coupling, optical coupling, or both between the sight system 100, attached modules, and/or the system to which the sight system 100 is mounted. For example, the rails 106 or 108 can include fiber optic non-contact optical connectors to optically couple optical signals between a module and the sight system 100, between a module and another module, between a module and the device to which the sight system 100 is mounted, or between the sight system 100 and the device to which it is mounted. The module rails 108 can be integrated (e.g., cast or machined into) the housing 102 which can result in suitable alignment between the optical connectors and corresponding optical connectors on attached modules.

The sight system 100 can include a front end optical system 110 configured to provide an image of a field of view. The field of view can be at least about 2° and less than or equal to about 20°, at least about 4° and less than or equal to about 15°, at least about 6° and less than or equal to about 10°, at least about 7° and less than or equal to about 9°. The front end optical system 110 can include a reticle at a real image plane of the optical system. The front end optical system can be configured to provide a magnified image of the field of view where the magnification is at least about 1× and less than or equal to about 25×, at least about 2× and less than or equal to about 10×, at least about 3× and less than or equal to about 5×.

The sight system 100 can include an eyepiece 112 configured to provide to a user a direct-view capability where the user sees the optical image of the field of view of the front end optical system 110. The eyepiece 112 can have a field of view that is at least about 15° and less than or equal to about 40°, at least about 20° and less than or equal to about 35°, at least about 30° and less than or equal to about 34°.

The sight system can include an image sensor 114 situated within the housing 102. The image sensor 114 can be any suitable image sensor capable of converting electromagnetic radiation to electrical data. For example, the image sensor 114 can be a focal plane array, such as a CMOS image sensor, a CCD, or the like. The image sensor 114 can be a relatively high resolution (e.g., about 1 megapixel, about 2 megapixels, about 5 megapixels, or greater than about 5 megapixels), electronic-zoom-capable CMOS imager. The image sensor 114 can be configured to see the same boresighted image and reticle as the direct view channel (e.g., the view provided to the user by a combination of the front end optical system 110 and the eyepiece 112). The image sensor 114 and associated electronics and modules can be configured to provide greater magnification compared to the direct-view channel (e.g., through an electronic zoom functionality) and/or an image recording functionality.

The sight system 100 can include a display system (not shown) that shares the eyepiece 112 with the front end optical system such that the sight system 100 can provide a direct-view mode where the user sees the image produced by the combination of the front end optical system and the eyepiece, and a video view mode where the user sees the image acquired by the image sensor 114 and presented on the display system through the eyepiece 112. The display system can be, for example, monochrome or color and can conform to a video or resolution standard such as SXGA, VGA, HD720, HD1080, WGA, and the like. The display system can be configured to present magnified imagery from the direct view channel by displaying and magnifying image data acquired by the image sensor 114. The display system can be configured to present imagery or information from any module mounted to the module rails 108 such as a rail-mounted thermal or other spectral band camera. The display system can be configured to present a ballistics-corrected reticle which may be derived from, for example, a mounted LRF.

Thus, the sight system 100 can be configured to provide direct view sighting, video sighting, video identification, video recording, a data interface display, and the like. The sight system 100 can be configured to accept a range of other capabilities by providing a modular attachment system with the module rails 108 using a standardized electrical, data, and mechanical interface. For example, the rails can be similar to power rails manufactured by T.Worx Ventures as described in U.S. Pat. No. 7,627,975, Wilcox Industries' fusion rail system, or NATO's powered rail standard. The sight system 100 can integrate infrared functionality thereby reducing or eliminating a need for using clip-on thermal imagers which can add to the weight of the gun, alter the balance of the gun, and may be misaligned relative to the bore of the gun. In some embodiments, the sight system 100 can provide a direct view channel and a relatively high-sensitivity CMOS channel to provide sighting during diurnal intervals of low thermal contrast.

In some embodiments, the sight system 100 can include a radio frequency ("RF") communication system 116 situated within the housing 102. The RF communication system 116 can be configured to communicate with external systems such as, for example, visualization systems, night vision goggles, data processing systems, weapons systems, computers, cellular telephones, PDAs, laptops, or other such electrical devices associated with the user or another person. The RF communication system 116 can be utilized to transmit and receive information to these other systems to integrate information from the sight system 100 to other systems. For example, the sight system 100 can be utilized in a rapid target acquisition ("RTA") system that combines imagery and other information from the sight system 100 with information from a visualization system of a user to provide the user with a video display that shows the pointing direction of the sight system on the display of the visualization system. In this way, the user can quickly adjust an aiming point without looking through the sight system 100. In some embodiments, the RF communication system 116 can communicate using any suitable wireless communication such as through the IEEE 802.11 standard, including IEEE 802.11(a), (b), (g), or (n). In some embodiments, the RF communication system 116 communicates according to BLUETOOTH™ Specification Version 3.0+HS adopted in 2009. In some embodiments, the RF communication system 116 transmits and receives CDMA, GSM, AMPS or other known signals that are used to communicate within a wireless cell phone network. In some embodiments, the RF communication system 116 is an ultra-wide band communication system. In some embodiments, the RF communication system 116 is configured to communicate with devices that are less than about 10 m from the sight system 100. The RF communication system 116 can be configured to have a low probability of interception and/or a low probability of detection and a relatively high bandwidth.

In some embodiments, the sight system 100 can include integrated sensors to provide data to the sight system 100, to attached modules, or to external systems through the RF communication system 116. The integrated sensors can be, for example, tilt sensors, inertial sensors, accelerometers, or the like. In some embodiments, information from the integrated sensors and an attached LRF can be used to derive a ballistics-corrected reticle for display on the display system.

The sight system 100 can include a power source 118 situated within the housing 102. For example, the housing can include one or more batteries to provide power to the electrical components in the sight system 100 and/or to modules attached to the module rails 108.

The sight system 100 can be configured to be relatively light-weight compared to other sight systems providing similar functionality. For example, the sight system 100 can be configured to weigh less than or equal to about 3 lbs., less than or equal to about 2 lbs. or less than or equal to about 1.5 lbs. Based at least in part on additional capabilities provided by the sight system 100 and the significant weight reduction associated with use of rail-mounted imagers or LRF modules in place of stand-alone weapon mounted systems, the total weight of a gun or weapon system incorporating the sight system 100 can be significantly reduced.

Figure 2:
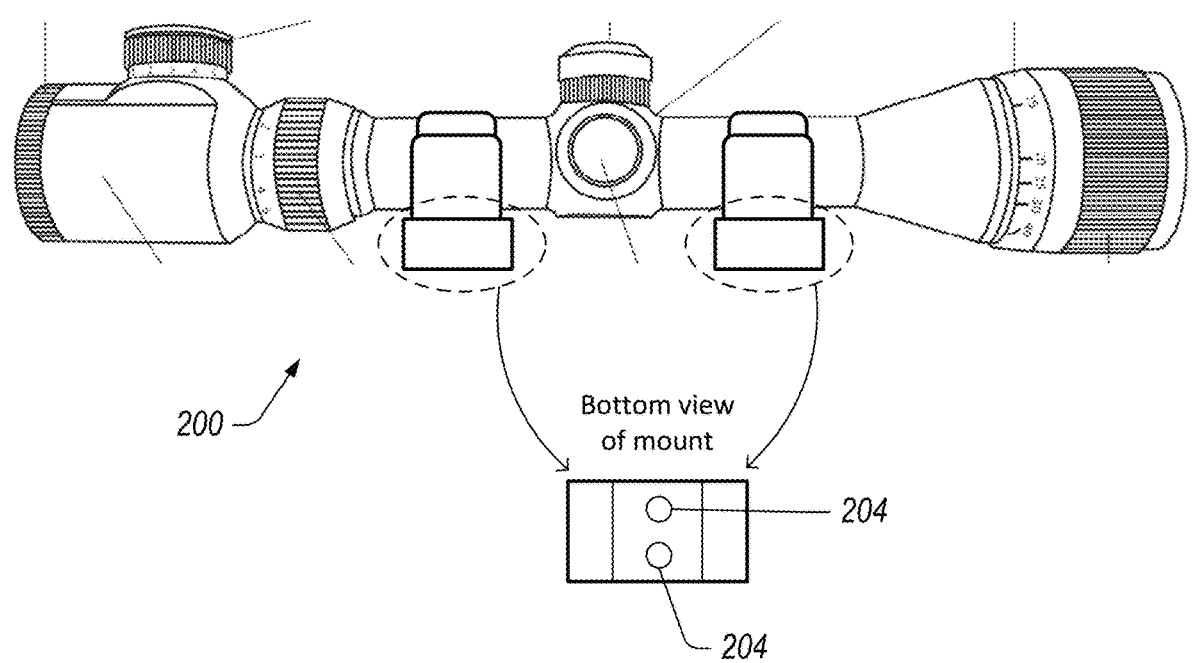
FIG. 2 illustrates an example accessory for a firearm, the accessory having non-contact optical connections, the accessory configured to attach to the tactical rails of FIGS. 1A and 1B so that the non-contact optical connections of the accessory align with corresponding non-contact optical connections of the tactical rail.

FIG. 2 illustrates an accessory 200 for a firearm, the accessory having non-contact optical connections 204, the accessory configured to attach to the tactical rail of FIG. 1 so that the non-contact optical connections 204 of the accessory align with corresponding non-contact optical connections 104 of the tactical rail 102. As with the tactical rail 102, the accessory 200 can include two non-contact optical connections 204, respectively dedicated to transmitting and receiving optical signals, or it can include a single non-contact optical connection configured to be optically coupled to a TOSA, a ROSA, or a combined transmission and receiving optical sub-assembly.

Figure 3:
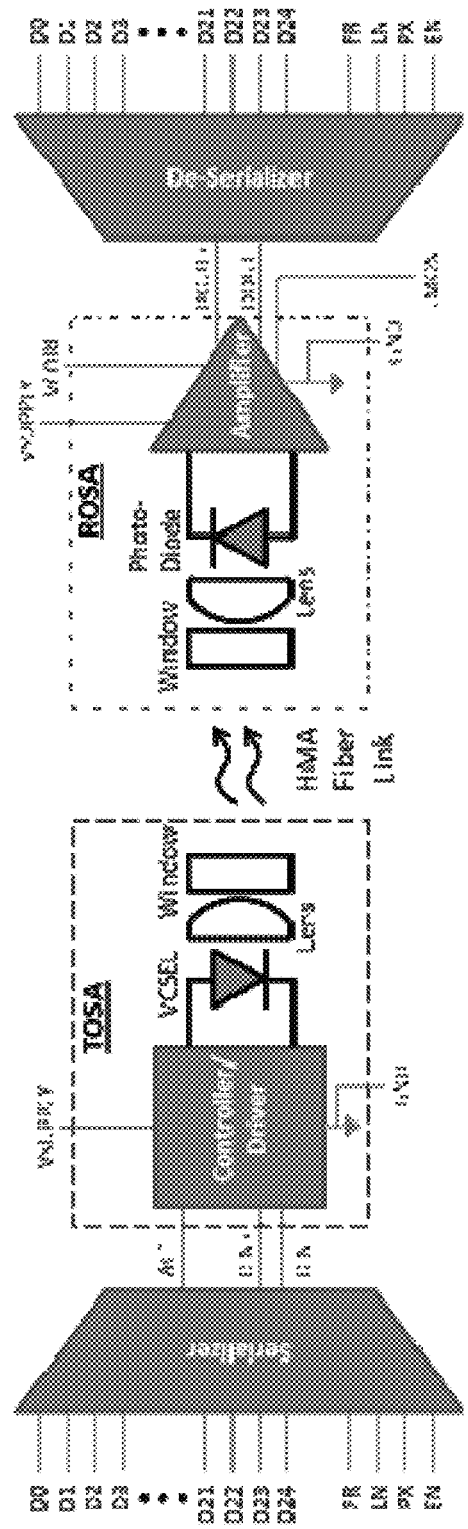
FIG. 3 illustrates an electrical diagram of an example transmit optical sub-assembly (TOSA) and an example receive optical sub-assembly (ROSA).

FIG. 3 illustrates an electrical diagram of a transmit optical sub-assembly (TOSA) and a receive optical sub-assembly (ROSA). The TOSA can be coupled to a serializer configured to provide a single output signal from one or more input signals. The output signal can be directed to a controller/driver configured to drive a light emitting component (e.g., a VCSEL, LED, etc.). The light emitting component emits an optical signal that is collimated by a lens and transmitted through a window. This optical signal can be routed to a corresponding ROSA using a fiber link (e.g., optical fibers). The ROSA can include a window and a lens, the lens configured to substantially direct the received optical signal onto a light detecting device (e.g., a photodiode). The light detecting device is electrically coupled to an amplifier that is coupled to a de-serializer. The de-serializer is configured to receive an input signal and output one or more output signals. The one or more output signals of the de-serializer correspond to the one or more input signals of the serializer. The windows of the TOSA and ROSA are configured to protect the lens and electrical components of the TOSA and ROSA from outside contaminants such as dust, particles, water, etc. In addition, the windows can be be configured to be flush with a surface of an accessory or tactical rail to provide a relatively smooth surface where the non-contact optical connections are located. In some embodiments, the windows include a gasket around the window to reduce or prevent contaminants such as particles or liquids from entering between the corresponding windows of the TOSA of the tactical rail and a ROSA of an accessory (or vice versa).

Figure 4:
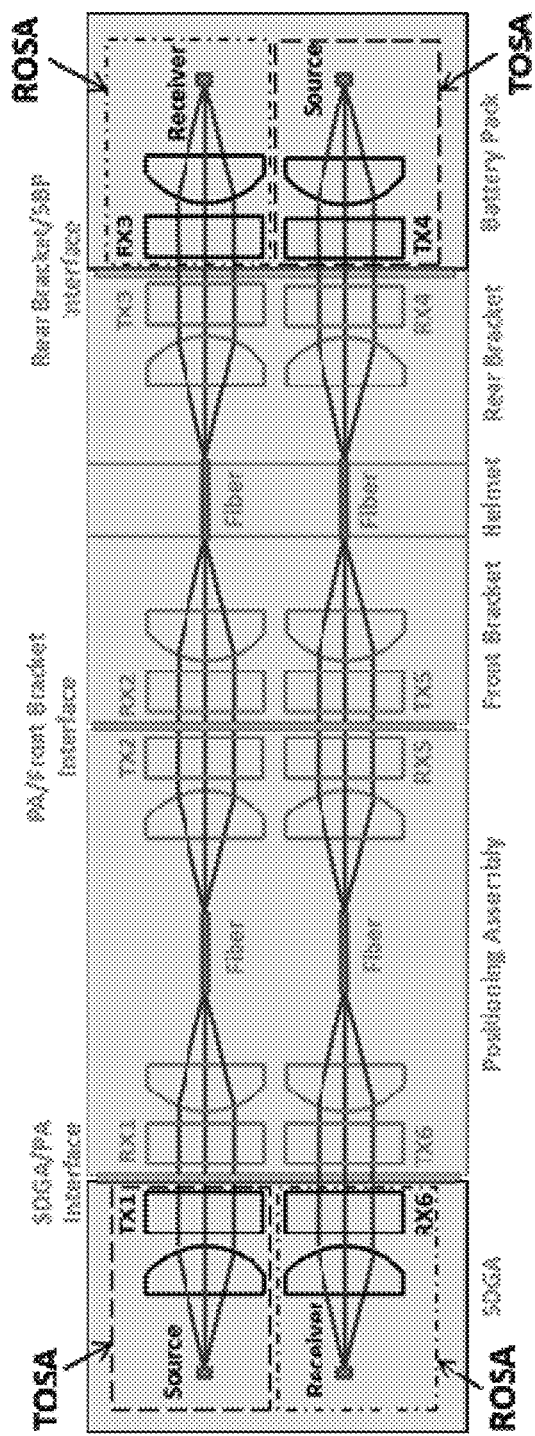
FIG. 4 illustrates an optical diagram of an example transmit optical sub-assembly (TOSA) and an example receive optical sub-assembly (ROSA).

FIG. 4 illustrates an optical diagram of a transmit optical sub-assembly (TOSA) and a receive optical sub-assembly (ROSA). An accessory, such as a goggle or SDGA or a battery pack, can include both a ROSA and a TOSA. The optical signals can be routed between accessories using one or more lenses and one or more fiber links comprising optical fibers. In some embodiments, a TOSA from a first accessory can be coupled directly to a ROSA of a second accessory through one or more fiber optic links. Similarly, a TOSA from the second accessory can be coupled directly to a ROSA of the first accessory through one or more fiber optic links.

FIGS. 5A-5D illustrate a modular ROSA/TOSA unit 300 comprising unitary mechanical housing 302 that includes a TOSA and a ROSA, the housing 302 including corresponding non-contact optical connections 304 for the TOSA and the ROSA as well as electrical pins 306. This modular unit 300 can be used to provide the described optical signal communication to a tactical rail and/or accessory.

Figure 6A:
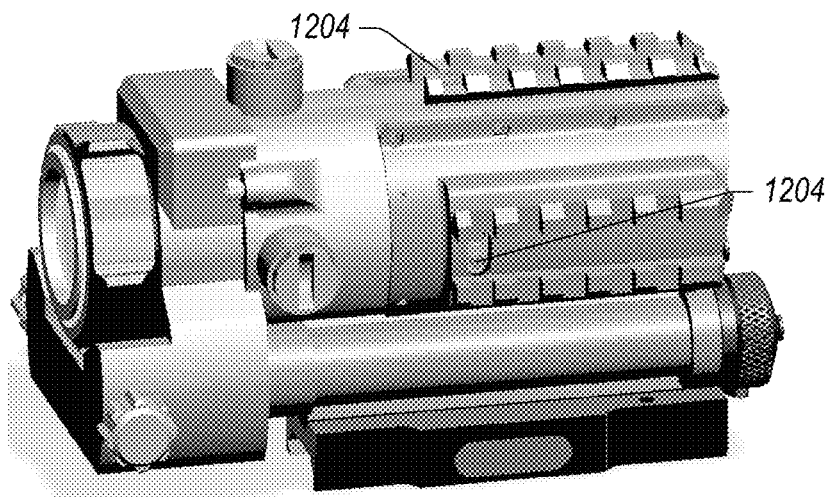
FIGS. 6A-6C illustrate a site system with a tactical rail having non-contact optical connections on a top rail and a side rail, shown in perspective, top plan, and side elevation views, respectively.
Figure 6B:
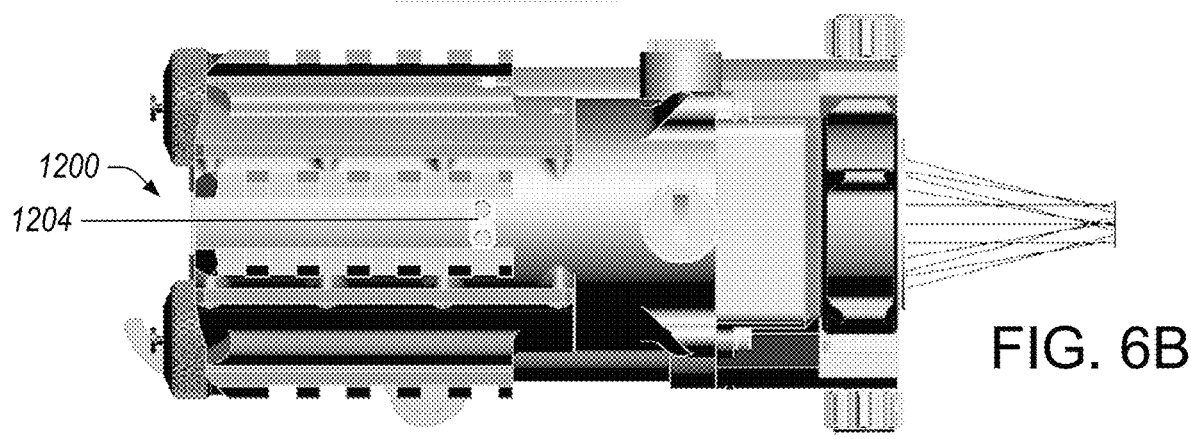
Figure 6C:
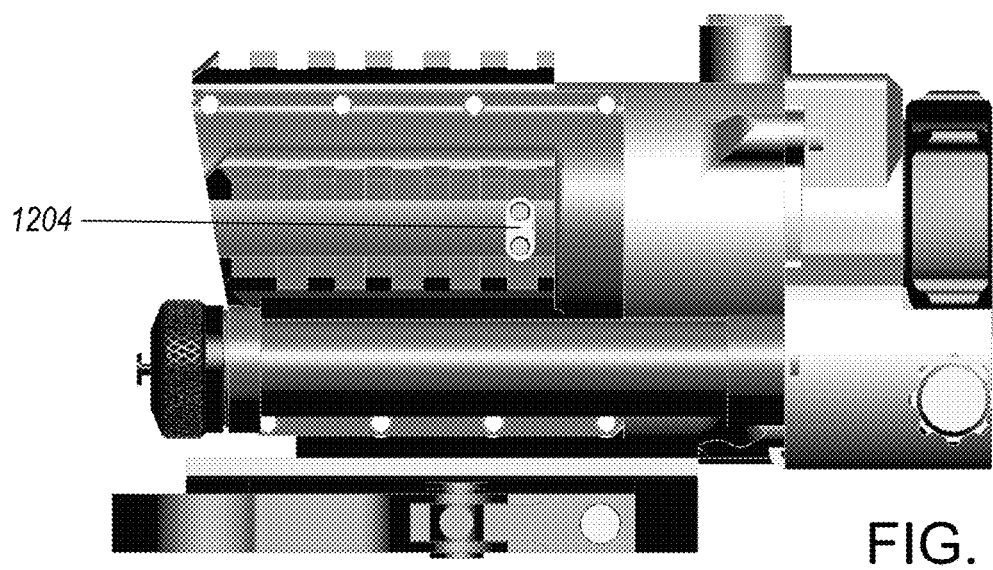

FIGS. 6A-6C illustrate a site system 1200 with a tactical rail 1202 having non-contact optical connections 1204 on a top rail and a side rail. The site system 1200 can include non-contact optical connections 1204 configured to allow the quick addition of modules configured to optically communicate using compatible optical data link interfaces. The site 1200 can include non-contact optical connections 1204 coupled to electrical circuitry configured to process and/or transmit the information to RF transceivers, other modules coupled to the site 1200, a firearm to which the site 1200 is coupled, or any combination of these or the like.

Figure 7:
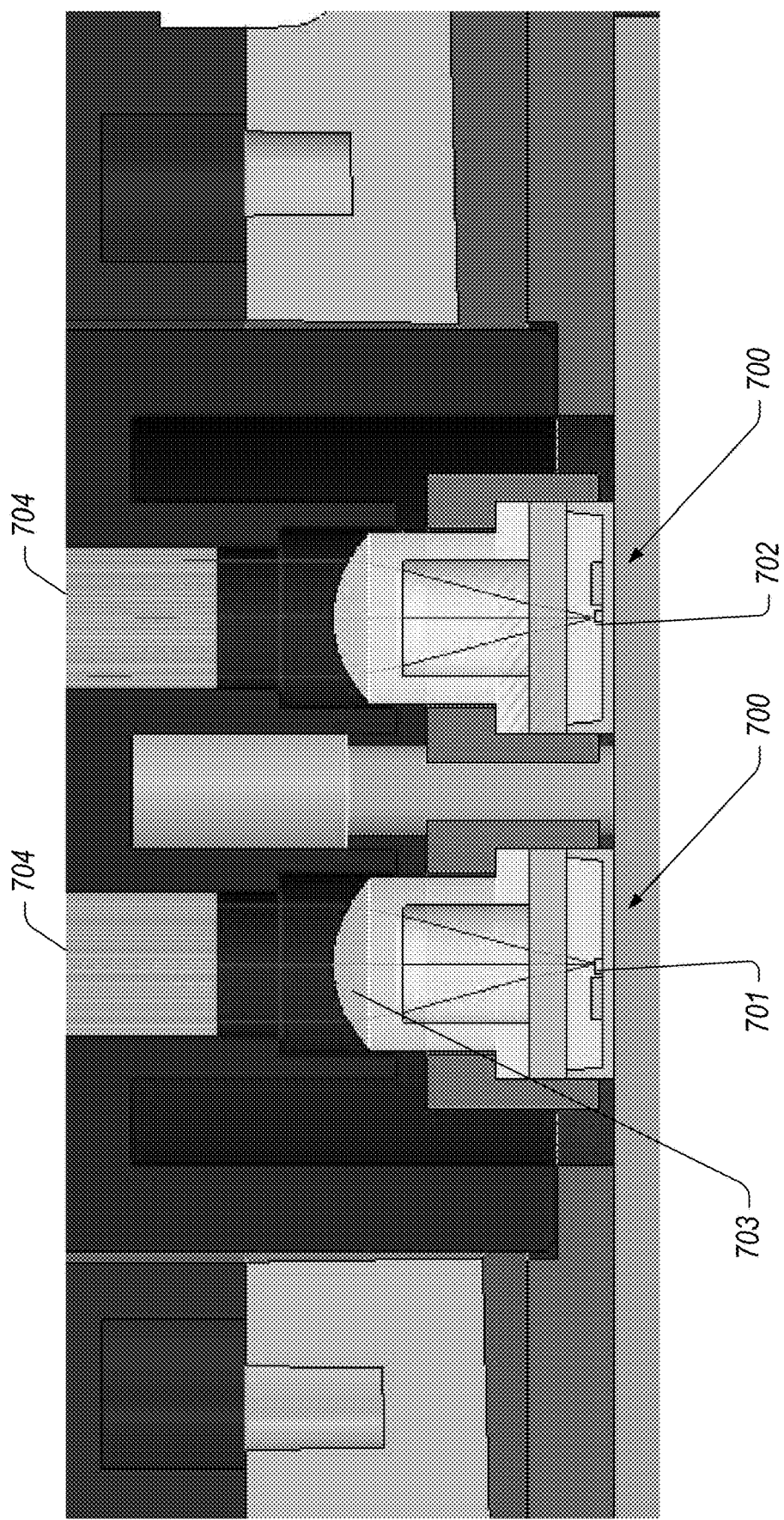
FIG. 7 illustrates a cross-section view of a TOSA and ROSA in an example tactical rail.

FIG. 7 illustrates a cross-section view of a TOSA and ROSA in an example tactical rail 700. The TOSA and ROSA include corresponding light emitting 701 or light detecting elements 702. The TOSA includes collimating lens 703 and the ROSA includes focusing lens 703. The light passes through windows 704. The relatively low power miniature optical transmitter and receiver modules and small wide gap coupling optics 702, 703 can be used to transmit high-bandwidth data across fiber optics and can be used to couple high speed data and video across the rail mount between a tactical rail and add-on modules.

Example Embodiments

The following example embodiments describe a Transmitter Optical Sub-Assembly (TOSA) and Receiver Optical Sub-Assembly (ROSA) that can be used with a firearm, an accessory such as a night vision goggle, or the like, and implements a fiber optic subsystem that can be used for video and data transmission. The TOSA and ROSA operate in conjunction with a serializer, fiber optic link and de-serializer to form a fiber optic communication channel for transmission of controls and data between accessories and/or between an accessory and a firearm. Two fiber optic communication channels can be used for bi-directional communication.

The TOSA and ROSA are integrated into a common mechanical housing (e.g., see FIG. 5). The TOSA operates from a single 2.5V power supply. It outputs a digital light stream corresponding to the differential SLVS electrical signal at its input when powered and activated. The TOSA includes a sleep mode that is entered when the ACT signal is set low (e.g., a signal on an electrical pin designated as the ACT pin, examples of which are described with respect to FIG. 5). In this mode the TOSA consumes less than or equal to about 1 µW, or less than or equal to about 15 µW. The TOSA includes VCSEL, VCSEL Driver, Collimating optic, Window, Housing (Shared with ROSA).

The ROSA operates from two power supplies: 2.5V for the PIN Diode and 1.2V for the trans-impedance amplifier. It outputs a differential SLVS electrical signal corresponding to the light signal at its input when it is powered. The ROSA also includes a current monitor (IMON) whose output mirrors the photodiode current. This signal may be used for feedback to the transmitter to control the output power level. The ROSA automatically enters a sleep mode to reduce power consumption within less than or equal to about 5 µs of detecting line inactivity. The ROSA can be prevented from entering the sleep mode by preventing absence of line activity for periods longer than about 5 µs. In the sleep mode the ROSA powers only an input detection circuit. It automatically exits sleep mode and resumes full-power operation within less than or equal to about 100 µs of detecting line activity. The ROSA includes PIN Diode, Trans-impedance amplifer, Focusing optic, Window, Housing (shared with TOSA).

| TOSA electrical parameters: | |
|---|---|
| Parameter | Design Specification |
| Power consumption (active mode) | 5 mW maximum |
| VSUPPLY Input voltage range (nominal 2.5 V) | 2.25 V minimum to 3.6 V maximum |
| Permissible VSUPPLY power supply noise | Max 100 mVp-p (0-10 GHz) |
| Digital Input (DIN+, DIN−, ACT) | SLVS-200 |
| Common mode voltage on data lines | 340 mV maximum |
| Time from applied valid ACT signal to first valid output | 5 µs maximum |
| De-activation delay time | 0.1 µs maximum |
| VACT, H (Activation high voltage level, Vsupply = 2.5 V) | Min 1.0 V, Max 2.5 V |
| VACT, L (Activation low voltage level) | Min 0 V, Max 0.4 V |
| VACT maximum input voltage rating | Max negative −0.5 V Maximum positive 3.6 V |

| TOSA optical parameters: | |
|---|---|
| Parameter | Design Specification |
| Center Wavelength | 850 ± 10 nm |
| Spectral Bandwidth | ≤1 nm |
| Bandwidth | 0.7 GBPS |

| ROSA electrical parameters | |
|---|---|
| Parameter | Design Specification |
| TIA Power Consumption (active) | 7 mW (active) maximum |
| TIA Power Consumption (sleep) | 3 µW(sleep) maximum |
| Input voltage range - VSUPPLY (2.5 V Nominal) | 2.25 V minimum to 3.6 V maximum |
| Input voltage range - VCORE (1.2 V Nominal) | 1.15 V minimum to 1.25 V maximum |
| Permissible power supply noise - VSUPPLY | Max 200 mVp-p (0-10 GHz) |
| Permissible power supply noise - VCORE | Max 100 mVp-p (0-10 GHz) |
| Sleep mode delay time delay | 5 µs max after detecting line inactivity |

-continued

ROSA electrical parameters

| Parameter | Design Specification |
|---|---|
| Sleep mode re-activation time delay | 100 μs max after detecting line activity |
| Digital Output | SLVS-200 |

ROSA optical parameters

| Parameter | Design Specification |
|---|---|
| Input sensitivity for 0.7 GBPS reception | −17 dBm |
| Bandwidth | 1.25 GBPS |
| Optical Wavelength | 850 ± 10 nm |

ROSA/TOSA pin designations

| Name | Number | Transmitter/ Receiver | Description |
|---|---|---|---|
| DIN+ | 1 | Transmitter | Positive Differential Data Input |
| VSUPPLY (Transmitter) | 2 | Transmitter | 2.5 V Power Supply |
| ACT | 3 | Transmitter | Activates VCSEL Driver - Active High |
| DIN− | 4 | Transmitter | Negative Differential Data Input |
| VSUPPLY (Receiver) | 5 | Receiver | 2.5 V Power Supply (PIN Diode) |
| DOUT− | 6 | Receiver | Negative Differential Data Output |
| IMON | 7 | Receiver | Receiver Current Monitor |
| VCORE | 8 | Receiver | 1.2 V Power Supply (Core) |
| DOUT+ | 9 | Receiver | Positive Differential Data Output |
| GND | 10 | Transmitter/ Receiver | Power Supply Ground |

Optical element surface quality meets the specifications stated in MIL-PRF-13830. External optical surfaces exhibit neither damage (8.1) nor degradation of performance (8.2) when tested in accordance with the adhesion and severe abrasion tests of Appendix C of MIL-PRF-13830B.

The embodiments described herein are exemplary. Modifications, rearrangements, substitute processes, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the LUT described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A firearm comprising:
a tactical rail including at least one non-contact optical connection configured to interface with a corresponding non-contact optical connection on a firearm accessory,
a transmit optical sub-assembly (TOSA) comprising a light source, a collimating optical element, and a window configured to receive light from the light source therethrough, wherein the TOSA is disposed within the tactical rail; and
a receive optical sub-assembly (ROSA) comprising a focusing optical element and an optical detector configured to receive an optical signal from the firearm accessory, wherein the ROSA is disposed within the tactical rail.

2. The firearm as recited in claim 1, wherein with the accessory mounted on the tactical rail, the non-contact optical connections on the tactical rail and the accessory align sufficiently such that optical signals can be transferred between the tactical rail and the accessory to enable communication of optical signals between accessories mounted on the tactical rail and/or between an accessory mounted to the tactical rail and the firearm itself.

3. The tactical rail arrangement as recited in claim 1, wherein the tactical rail comprises a plurality of ridges having a T-shaped cross-section.

4. The tactical rail arrangement as recited in claim 1, further comprising a second non-contact optical connection configured to transmit and receive optical signals to a second firearm accessory.

5. The tactical rail arrangement as recited in claim 1, further comprising an accessory mount configured to receive the firearm accessory.

6. The tactical rail arrangement as recited in claim 5, wherein the accessory mount comprises an integral conductive element disposed within and/or along a side of the accessory side.

7. The tactical rail arrangement as recited in claim 6, wherein the conductive element is disposed along a groove.

8. The tactical rail arrangement as recited in claim 1, wherein the TOSA comprises a vertical-cavity surface-emitting laser (VCSEL).

9. A tactical rail arrangement for a firearm comprising:
a tactical rail configured to secure one or more firearm accessories to a firearm, wherein the tactical rail includes a plurality of non-contact optical connections configured to transfer optical signals between one or more accessories mounted to the tactical rail and/or to one or more electrical systems of the firearm;
a transmit optical sub-assembly (TOSA) comprising a light-collimating optical element; and
a receive optical sub-assembly (ROSA) comprising a light-focusing optical element,
wherein the TOSA and ROSA are respectively coupled to one or more transmit non-contact optical connections of the plurality of noncontact optical connections and to one or more receive non-contact optical connections of the plurality of non-contact optical connections.

10. The tactical rail arrangement as recited in claim 9, wherein the TOSA is configured to optically couple with a corresponding ROSA disposed within the firearm accessory, and wherein the ROSA of the tactical rail is configured to optically couple with a corresponding TOSA disposed within the firearm accessory.

11. The tactical rail arrangement as recited in claim 9, wherein the tactical rail is configured to provide a communication network for accessories mounted to the tactical rail, wherein communication between accessories utilizes optical signals.

12. The tactical rail arrangement as recited in claim 11, wherein the tactical rail is configured to control communication across the communication network utilizing a communication system.

13. The tactical rail arrangement as recited in claim 12, wherein the communication system is integral to the firearm or otherwise associated with the firearm.

14. The tactical rail arrangement as recited in claim 9, wherein the tactical rail comprises a plurality of ridges having a T-shaped cross-section.

15. The tactical rail arrangement as recited in claim 9, further comprising a second non-contact optical connection configured to transmit and receive optical signals to a second firearm accessory.

16. The tactical rail arrangement as recited in claim 9, further comprising an accessory mount configured to receive the firearm accessory.

17. The tactical rail arrangement as recited in claim 16, wherein the accessory mount comprises an integral conductive element disposed within and/or along a side of the accessory side.

18. The tactical rail arrangement as recited in claim 17, wherein the conductive element is disposed along a groove.

19. The tactical rail arrangement as recited in claim 18, wherein the TOSA comprises a VCSEL.

20. The tactical rail arrangement as recited in claim 9, wherein with the accessory mounted on the tactical rail, the non-contact optical connections on the tactical rail and the accessory align sufficiently such that optical signals can be transferred between the tactical rail and the accessory to enable communication of optical signals between accessories mounted on the tactical rail and/or between an accessory mounted to the tactical rail and the firearm itself.

\* \* \* \* \*